United States Patent
Han et al.

(10) Patent No.: US 8,508,144 B2
(45) Date of Patent: Aug. 13, 2013

(54) POWER SUPPLY AND DISPLAY DEVICE INCLUDING THE SAME

(75) Inventors: Sang Kyoo Han, Seoul (KR); Sung Soo Hong, Seoul (KR); Mi Ran Baek, Gyunggi-do (KR); Chung Wook Roh, Seoul (KR); Hee Seung Kim, Seoul (KR); Jae Sun Won, Gyunggi-do (KR); Ku Yong Kim, Gyunggi-do (KR); Jae Cheol Ju, Daejeon (KR); Don Sik Kim, Gyunggi-do (KR); Dong Jin Lee, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 290 days.

(21) Appl. No.: 13/094,335

(22) Filed: Apr. 26, 2011

(65) Prior Publication Data

US 2012/0153857 A1 Jun. 21, 2012

(30) Foreign Application Priority Data

Dec. 21, 2010 (KR) .................. 10-2010-0131698

(51) Int. Cl.
*H05B 37/02* (2006.01)
*H02M 1/12* (2006.01)

(52) U.S. Cl.
USPC .............................. 315/224; 315/247; 363/44

(58) Field of Classification Search
USPC ................ 315/224, 246, 247; 363/39, 44–47
See application file for complete search history.

(56) References Cited

U.S. PATENT DOCUMENTS

| | | | |
|---|---|---|---|
| 2002/0063617 A1* | 5/2002 | Hu et al. | 336/92 |
| 2009/0021179 A1 | 1/2009 | Kim et al. | |
| 2012/0154091 A1* | 6/2012 | Won et al. | 336/170 |
| 2012/0223797 A1* | 9/2012 | Won et al. | 336/170 |

FOREIGN PATENT DOCUMENTS

| | | |
|---|---|---|
| JP | 5-063105 A | 3/1993 |
| JP | 08-138951 | 5/1996 |
| JP | 2000-195730 A | 7/2000 |
| JP | 2007-336339 A | 12/2007 |
| KR | 1999-0055387 | 7/1999 |
| KR | 1019990055387 | 7/1999 |
| KR | 1020090054183 | 5/2009 |
| KR | 10-0910505 | 7/2009 |

OTHER PUBLICATIONS

Korean Office Action for Application No. 10-2010-0131698 mailed Oct. 29, 2012.
Korean Office Action for Application No. 10-2010-0131698 mailed Mar. 23, 2012.

* cited by examiner

*Primary Examiner* — Don Le
(74) *Attorney, Agent, or Firm* — Lowe Hauptman Ham & Berner, LLP••

(57) ABSTRACT

The power supply includes: an electromagnetic interference filter including a first filter which has a pair of electromagnetically coupled cores having at least two leg parts, first and second bobbins each having a tube-shaped body part having a penetration hole into which each of the leg parts is inserted and having a winding region defined as the circumference of the outer peripheral surface of the body part, and first and second coils respectively wound around the first and second bobbins to remove common mode electromagnetic interference included in power transmitted from a power line, the electromagnetic interference filter removing differential mode electromagnetic interference due to leakage inductance formed due to the leakage of magnetic flux flowing through the cores; a power factor corrector correcting a power factor of the power where the electromagnetic interference is removed; and a power converter switching the power-factor-corrected power into a driving power having a predetermined voltage level.

25 Claims, 13 Drawing Sheets

POWER SUPPLY AND DISPLAY DEVICE INCLUDING THE SAME

CROSS-REFERENCE TO RELATED APPLICATIONS

This application claims the priority of Korean Patent Application No. 10-2010-0131698 filed on Dec. 21, 2010, in the Korean Intellectual Property Office, the disclosure of which is incorporated herein by reference.

BACKGROUND OF THE INVENTION

1. Field of the Invention

The present invention relates to a power supply and a display device including the same, and more particularly, to a power supply having an electromagnetic interference filter consisting of simple circuits and a display device including the same.

2. Description of the Related Art

In general, a power supply is necessarily employed in order to supply driving power required for driving an electronic device satisfying various needs of a user.

This power supply transforms a commercial alternating current power source into the driving power, which may cause electromagnetic interference. Especially, a great deal of electromagnetic interference may be generated in a low frequency band at the time of performing a switching operation for power factor correction.

An electromagnetic interference filter may be employed in a power input, terminal to which a commercial alternating current is inputted, in order to remove electromagnetic interference. Electromagnetic interference may be largely divided into conducted emission and radiated emission, each of which may be further divided into differential mode electromagnetic interference and common mode electromagnetic interference.

A common mode choke coil is employed in each of a live line and a neutral line among power input lines to remove common mode electromagnetic interference, and at least one differential mode choke coil is separately employed to remove differential mode electromagnetic interference.

However, this causes an increase in volume due to the use of the choke coils for removing electromagnetic interference, resulting in a failure to meet the needs of a user desiring thin, small sized electronic equipment.

In the electromagnetic interference filter according to the related art, an insulation bobbin has a donut-shaped core and two coils are wound around the bobbin in opposite directions. This causes difficulty in achieving automatic production, thereby reducing a production rate thereof and increasing manufacturing costs.

Recently, many studies have been carried out with respect to techniques for reducing the overall sizes of products to improve the appearance and increase the marketability thereof. Accordingly, various flat panel display devices are being developed, such as a liquid crystal display (LCD), a plasma display panel (PDP), an organic light emitting diode (OLED) display, etc.

As display devices have become slim, recent display devices have a very narrow interval between a back cover and a power supply thereof. As a result, an electromagnetic interference filter mounted in the power supply is disposed adjacently to the back cover of the display device.

In a case in which the donut-shaped electromagnetic interference filter of the related art is mainly used, magnetic flux generated in the electromagnetic interference filter interferes with the back cover to vibrate the back cover, which causes noise in the display device.

SUMMARY OF THE INVENTION

An aspect of the present invention provides a power supply, which consists of a simple circuit without a separate choke coil for removing differential mode electromagnetic interference and has an electromagnetic interference filter manufactured by automatic production.

Another aspect of the present invention provides a display device including the power supply, capable of reducing vibration.

According to an aspect of the present invention, there is provided a power supply, including: an electromagnetic interference filter including a first filter which has a pair of electromagnetically coupled cores having at least two leg parts, first and second bobbins each having a tube-shaped body part having a penetration hole into which each of the leg parts is inserted and having a winding region defined as the circumference of the outer peripheral surface of the body part, and first and second coils respectively wound around the first and second bobbins to remove common mode electromagnetic interference included in power transmitted from a power line, the electromagnetic interference filter removing differential mode electromagnetic interference due to leakage inductance formed due to the leakage of magnetic flux flowing through the cores; a power factor corrector correcting a power factor of the power where the electromagnetic interference is removed; and a power converter switching the power-factor-corrected power into a driving power having a predetermined voltage level.

The first and second bobbins may have an insertion combining part by which the first and second bobbins are combined with each other.

The insertion combining part may include at least one insertion protrusion and at least one insertion groove into which the insertion protrusion is inserted.

The insertion combining part may be formed on facing surfaces of the first and second bobbins.

One end of the first coil may be electrically connected to a live terminal of the power line and one end of the second coil is electrically connected to a neutral terminal of the power line.

The first and second coils may be respectively wound in opposite directions.

The electromagnetic interference filter may further include a first capacitor group having first and second Y capacitors connected to each other in series between the live terminal and the neutral terminal of the power line and a first X capacitor connected to the first and second Y capacitors in parallel between the live terminal and the neutral terminal of the power line.

The electromagnetic interference filer may be electrically connected to a rear end of the first filter and further may include a second filter which has a pair of electromagnetically coupled cores having at least two leg parts, third and fourth bobbins each having a tube-shaped body part having a penetration hole into which each of the leg parts is inserted and having a winding region defined as the circumference of the outer peripheral surface of the body part, and third and fourth coils respectively wound around the third and fourth bobbins to remove the common mode electromagnetic interference included in the power transmitted from the power line.

The electromagnetic interference filter may further include a second capacitor group having third and fourth Y capacitors connected to each other in series between the other end of the first coil and the other end of the second coil of the first filter and a second X capacitor connected to the third and fourth Y capacitors in parallel between the other end of the first coil and the other end of the second coil of the first filter.

The pair of cores may be UU cores, UI cores, or CI cores.

The power supply may further include a rectifier rectifying and smoothing the power where the electromagnetic interference is removed by the electromagnetic interference filter and transmitting the rectified and smoothed power to the power factor corrector.

Each of the first and second bobbins may have a protrusion, by which the first and second coils are respectively wound to leak the electromagnetic flux.

According to another aspect of the present invention, there is provided a display device, including: a panel; a backlight unit disposed at the rear of the panel to irradiate light; a circuit board disposed at the rear of the backlight unit; a power supply formed on the circuit board to supply power to the backlight unit; and a back cover combined with the backlight unit to cover the circuit board and a transformer, wherein the power supply includes: an electromagnetic interference filter including a first filter which has a pair of electromagnetically coupled cores having at least two leg parts, first and second bobbins each having a tube-shaped body part having a penetration hole into which each of the leg parts is inserted and having a winding region defined as the circumference of the outer peripheral surface of the body part, and first and second coils respectively wound around the first and second bobbins to remove common mode electromagnetic interference included in power transmitted from a power line, the electromagnetic interference filter removing differential, mode electromagnetic interference due to leakage inductance formed due to the leakage of magnetic flux flowing through the cores; a power factor corrector correcting a power factor of the power where the electromagnetic interference is removed; and a power converter switching the power-factor-corrected power into a driving power having a predetermined voltage level.

The backlight unit may include at least one light emitting diode.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings so that they could be easily practiced by those skilled in the art to which the present invention pertains. However, in describing the exemplary embodiments of the present invention, detailed descriptions of well-known functions or constructions will be omitted so as not to obscure the description of the present invention with unnecessary detail.

In addition, unless explicitly described otherwise, "comprising" any components will be understood to imply the inclusion of other components but not the exclusion of any other components.

Hereinafter, the preferred embodiments of the present invention will be described in detail with reference to the accompanying drawings.

Figure 1:
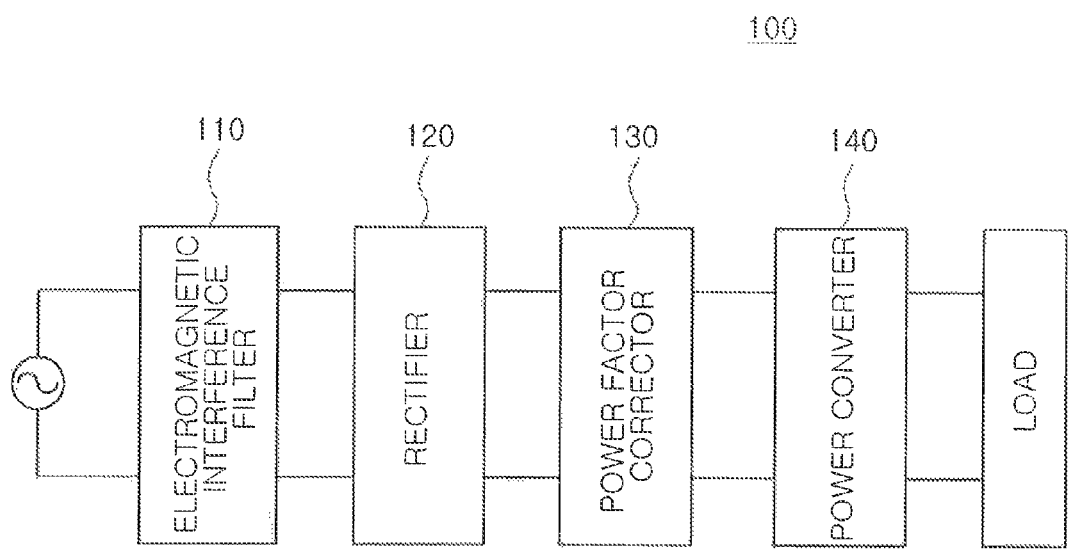
FIG. 1 is a block diagram of a power supply according to an embodiment of the present invention.

FIG. 1 is a block diagram of a power supply according to an embodiment of the present invention.

Referring to FIG. 1, a power supply 100 according to an embodiment of the present invention may include an electromagnetic interference filter 110, a rectifier 120, a power factor corrector 130, and a power converter 140.

The electromagnetic interference filter 110 is disposed between a live terminal and a neutral terminal of a power line, to which commercial alternating current power source is supplied to remove common mode electromagnetic interference and differential mode electromagnetic interference which are contained in power transmitted through the power line.

The rectifier 120 may rectify and smooth the power from which the electromagnetic interference is removed by the electromagnetic interference filter 110.

The power factor corrector 130 switches the power rectified by the rectifier 120 to adjust the phase difference between voltage and current of the power, thereby correcting the power factor. The differential mode electromagnetic interferences may be increased in a low frequency band by switching frequency of the power factor corrector 130 for the switching as shown FIG. 8b. Accordingly, the electromagnetic interference filter 110 according to the embodiment of the present invention may remove the common mode electromagnetic interference and the differential mode electromagnetic interferences shown in FIG. 8A and FIG. 8B, which will be described in derail below.

The power converter 140 may convert a voltage level of the power, which is power-factor-corrected by the power factor corrector 130, into a driving power having a predetermined voltage level, and then supply the driving power to the load.

Figure 2:
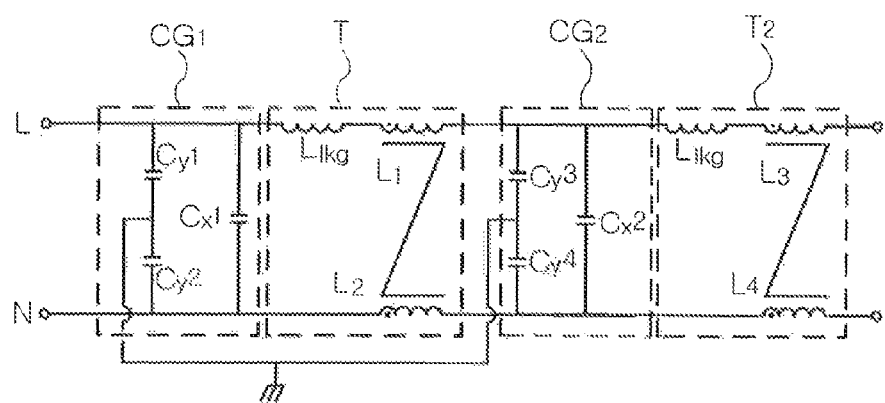
FIG. 2 is a schematic view showing an electromagnetic interference filter employed in a power supply according to the embodiment of the present invention.

FIG. 2 is a schematic view showing an electromagnetic interference filter employed in a power supply according to the embodiment of the present invention.

An electromagnetic interference filter 110 employed in a power supply 100 according to the embodiment of the present invention may include a first capacitor group CG1 and a first filter T1, and in addition, may include a second capacitor group CG2 and a second filer T2.

The first capacitor group CG1 may include first and second Y capacitors Cy1 and Cy2, and a first X capacitor Cx1.

The first and second Y capacitors Cy1 and Cy2 may be connected to each other in series between a live terminal L and a neutral terminal N of the power line. A connection point between the first Y capacitor Cy1 and the second Y capacitor Cy2 may be connected to the ground. The first and second Y capacitors Cy1 and Cy2 may remove common mode electromagnetic interference of the power flowing through the power line.

The first X capacitor Cx1 may be connected with the first and second Y capacitors Cy1 and Cy2 in parallel between the live terminal 1 and the neutral terminal N of the power line, and may remove differential mode electromagnetic interference of the power flowing thorough the power line.

The first filter T1 may include a first coil L1 and a second coil L2, and may be substituted for a leakage inductor element by a leakage inductance $L_{lkg}$ formed by leakage of magnetic flux flowing through a core.

In the first coil L1, one end may be connected to the live line L and the other end may be connected to the second filter T2. In the second coil L2, one end may be connected to the neutral line N and the other end may be connected to the second filter T2. The first coil L1 and the second coil L2 may remove the common mode electromagnetic interference of the power flowing through the power line. The leakage inductance $L_{lkg}$ may remove the differential mode electromagnetic interference.

The second capacitor group CG2 may include third and fourth Y capacitors Cy3 and Cy4, and a second X capacitor Cx2.

The third and fourth Y capacitors Cy3 and Cy4 may be disposed between the first filter T1 and the second filter T2, and may be connected to each other in series between the live terminal L and the neutral terminal N of the power line. A connection point between the third Y capacitor Cy3 and the fourth Y capacitor Cy4 may be connected to the ground. The third and fourth Y capacitors Cy3 and Cy4 may remove the common mode electromagnetic interference of the power flowing through the power line.

The second X capacitor Cx2 may be disposed between the first filter T1 and the second filter T2, and may be connected with the third and fourth Y capacitors Cy3 and Cy4 in parallel between the live terminal L and the neutral terminal N of the power line. The second X capacitor Cx2 may remove the differential mode electromagnetic interference of the power flowing thorough the power line.

The second filter T2 may include a third coil L3 and a fourth coil L4, and may be substituted for a leakage inductor element by a leakage inductance $L_{lkg}$ formed by leakage of magnetic flux flowing through the core.

In the third coil L3, one end may be connected to the other end of the first coil L1, and the other end thereof may be connected to the rectifier 120. In the fourth coil L4, one end may be connected to the other end of the second coil L2 and the other end thereof may be connected to the rectifier 120. The third coil L3 and the fourth coil L4 may remove the common mode electromagnetic interference of the power flowing through the power line. The leakage inductance $L_{lkg}$ may remove the differential mode electromagnetic interference.

Figure 3A:
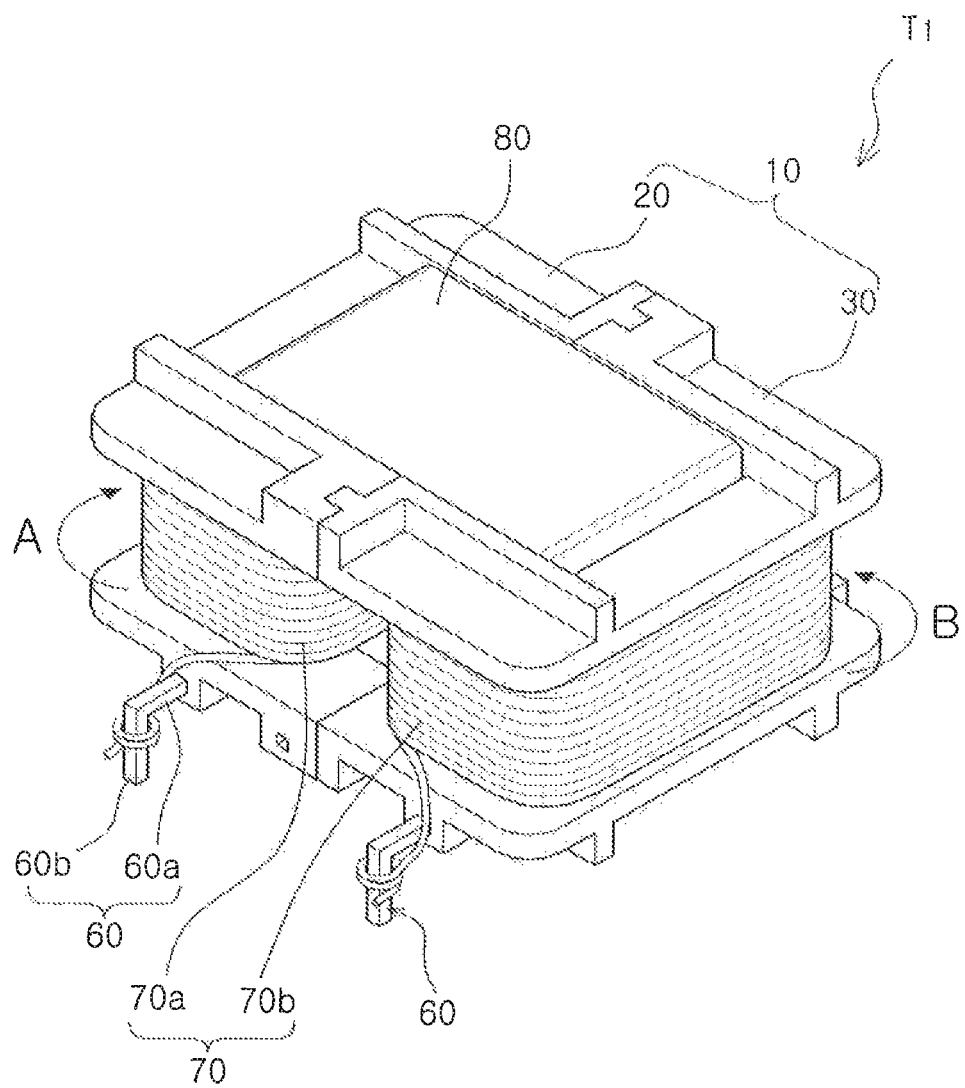
FIG. 3A to 3C are a perspective view of a first filter, an exploded perspective view of a bobbin, and an exploded bottom view of the bobbin, of the electromagnetic interference filter employed in a power supply according to the embodiment of the present invention.
Figure 3B:
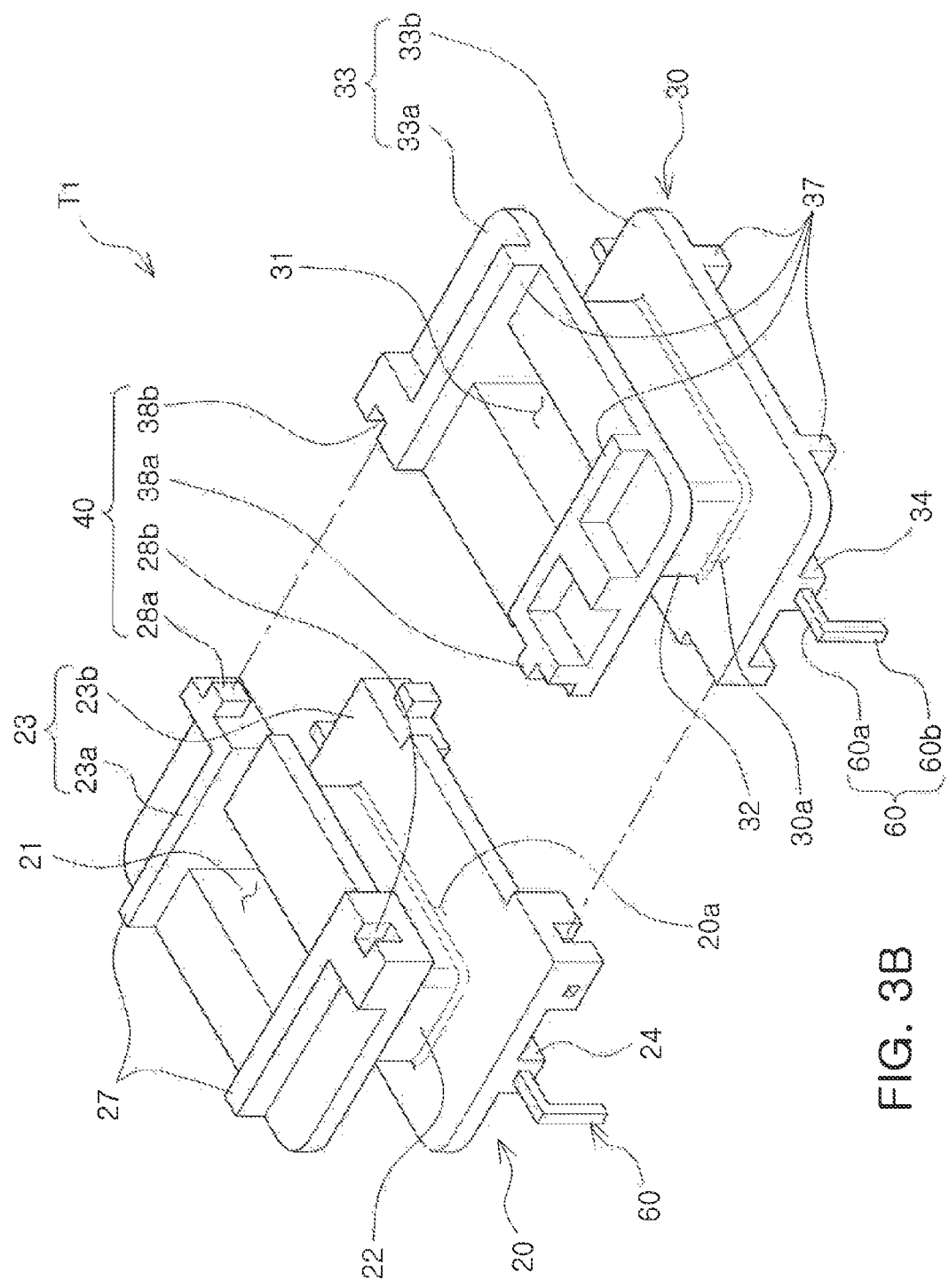
Figure 3C:
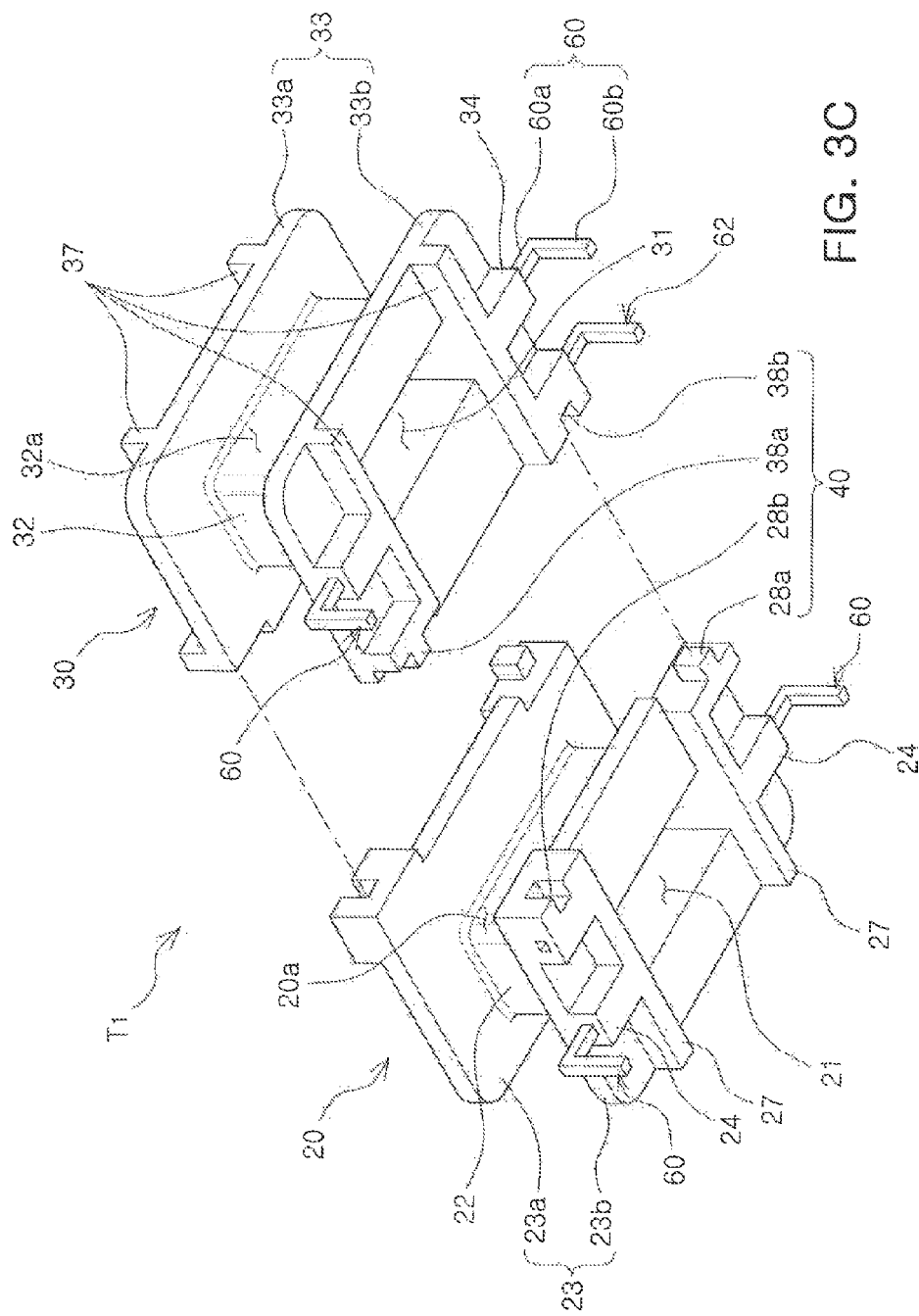

FIG. 3A to 3C are a perspective view of first filter T1, an exploded perspective view of a bobbin, and an exploded bottom view of the bobbin, of an electromagnetic interference filter employed in a power supply according to the embodiment of the present invention.

Referring to FIG. 3A to FIG. 3C, a first filter T1 of an electromagnetic interference filter 110 according to the present embodiment may include a bobbin part 10, a coil part 70 and a core 80.

The bobbin part 10 may include a first bobbin 20 and a second bobbin 30.

The first bobbin shown in FIG. 3 may include a tube-shaped body part 22 where a penetration hole 21 is formed in the center thereof, a flange part 23 vertically extended from both ends of the body part 22 in a direction outward of the body part 22, an external connection terminal 60 for the electrical and physical connection with the outside, and an insertion combining part 40.

The penetration hole 21 formed inside the body part 22 is used as a passage into which a portion of the core 80 is inserted. The present embodiment takes an example of a case in which a cross section of the penetration hole 21 is formed in a rectangular shape. This constitution may be provided according to the shape of the core 80 inserted into the penetration hole 21. The first bobbin 20 according to the embodiment of the present invention is not limited thereto, and the penetration hole 21 may be formed in various shapes correspondingly to the shape of the core 80 inserted thereinto.

The flange part 23 may be divided into a first flange part 23a and a second flange part 23b according to the disposed position thereof. A space formed among an outer peripheral surface of the body part 22, the first flange part 23a, and the second flange part 23b is used as a first winding part 20a in which the coil 70 is wound. Thus, the flange part 23 may serve as supporting the coil 70 wounded in the first winding part 20a at both sides thereof, at the same time while protecting the coil 70 from the outside and securing the insulation between the coil 70 and the outside.

A terminal coupling part 24, with which the external connection terminals 60 are coupled, is formed on one side surface of the second flange part 23b of the first bobbin 20. The terminal coupling part 24 according to the present embodiment may be protruded downwardly from the second flange part 23b.

The external connection terminals 60 are coupled with the terminal coupling part 24 such that the external connection terminals 60 are protruded outwardly and downwardly from an outward surface of the terminal coupling part 24 in a direction outward of the body part 22. Especially, each of the external connection terminals according to the present embodiment may include an extension portion 60a protruded in parallel with the second flange part 23b, and a coupling portion 60b bent at a right angle (e.g., downwardly) from the extension portion 60a. Herein, the coupling portion 60b is coupled with, for example, a substrate (e.g., a substrate of SMPS), or the like, and thus, achieving a physical and electrical connection with the substrate.

As shown in FIG. 3, in the first bobbin 20 according to the present embodiment, two external connection terminals 60 may be disposed toward opposite directions respectively. Accordingly, both ends of the first coil 70a wound in the first winding part 20a are coupled with the two external connection terminals 60 respectively, and thus, achieving electrical connection with the external connection terminals 60.

Further, the first filter T1 of the electromagnetic interference filter 110 according to the present embodiment may include ribs 27 on an outer surface of the flange part 23. The ribs 27 may be formed on the outer surface of the flange part 23 in a protrusion shape where the ribs 27 are protruded outwardly. The ribs 27 reinforce the stiffness of the flange part 23 to prevent the flexure of the flange part 23.

Further, the ribs 27 according to the present embodiment prevent lateral movement of the core 80 when the core 80 is inserted into the first bobbin 20 and the second bobbin 30. To achieve this, the ribs 27 are protruded in a shape corresponding to the shape of the core 80. As a result, the first and second bobbins 20 and 30 are strongly combined with the core 80, thereby increasing the closely contacted force therebetween.

Meanwhile, the present embodiment takes an example of a case in which the ribs 27 may be formed on the outer surfaces of all the two flange parts 23 included in the first bobbin 20. However, the present invention is not limited thereto, and the ribs 27 may be selectively formed on only one of the two flange parts.

The first bobbin 20 according to the present embodiment is combined with the second bobbin 30 to constitute one body. To achieve this, the first bobbin 20 includes an insertion combining part 40 formed on the outer surface of the flange part 23.

The insertion combining part 40 includes insertion protrusions 28a and insertion grooves 28b.

The insertion protrusions 28a and the insertion grooves 26b according to the present embodiment may be formed on side surfaces of the first and second bobbins 20 and 30, where the first bobbin 20 and the second bobbin 30 face each other, in the outer surface of the flange part 23. Accordingly, the insertion combining part 40 is included in the first bobbin 20 and also in the second bobbin 30.

This insertion combining part 40 will be described in more detail in description regarding the second bobbin 30.

The second bobbin 30 may be constituted in a similar shape to the first bobbin 20, and different from the first bobbin only in constitution of the external connection terminals 60.

Therefore, the detailed description about the same constitution as the upper bobbin 20 will be omitted, and constitution elements of the external connection terminals 60 distinct from the first bobbin 20 will be described in more detail below.

The second bobbin 30 according to the present embodiment may be characterized by including at least three external connection terminals 60. Each of the external connection terminals 60 may include an extension portion 60a and a coupling portion 60b, like the first bobbin 20.

Only two of three external connection terminals 60 of the second bobbin 30 are connected to the second coil 70b wound in a second winding part 30a. Therefore, the two external connection terminals 60 may be disposed in opposite directions, respectively, like the first bobbin. As a result, both ends of the second coil 70b wound in the second winding part 30a are coupled with two external connection terminals 60, respectively, thereby achieving an electric connection.

The rest external connection terminal 62 (hereinafter, referred to as 'subsidiary terminal') may be used for distinguishing between the first bobbin 20 and the second bobbin 30.

The first bobbin 20 and the second bobbin 30 according to the present embodiment may be formed in similar shapes, taken as a whole. The second bobbin 30 has the same shape as the first bobbin 20 only when the second bobbin 30 does not have the subsidiary terminal 62. Therefore, it is difficult to distinguish between the first bobbin 20 and the second bobbin 30 easily with the naked eyes.

Accordingly, the electromagnetic interference filter 110 according to the present embodiment may employ the subsidiary terminal 62 in the second bobbin 30, in order to distinguish between the first bobbin 20 and the second bobbin 30 easily.

As the second bobbin 30 has the subsidiary terminal 62, the first bobbin 20 and the second bobbin 30 according to the present embodiment are clearly distinguished from, each other. As a result, the coil 70 may be prevented from being wound in the wrong direction due to error in distinguishing between the first bobbin 20 and the second bobbin 30 at the time of manufacturing time.

In the electromagnetic interference filter 110 according to the present embodiment, when the first bobbin 20 and the second bobbin 30 are combined with each other, the numbers of external connection terminals 60 disposed at both sides of the electromagnetic interference filter 110 are different by the subsidiary terminal 62. In other words, while two external connection terminals 60 may be disposed at one side, three external connection terminals 60 and 62 may be disposed at the other side.

As a result, even when the first filter T1 of the electromagnetic interference filter 110 according to the present embodiment is mounted on a substrate (e.g., a substrate of SMPS), the mounting direction of the electromagnetic interference filter 110 may be easily found on the basis of a form where the external connection terminals may be disposed. Accordingly, time required for mounting may be substantially reduced.

Meanwhile, referring to FIG. 3c, the present embodiment takes an example of a case in which the subsidiary terminal 62 and any one of the other external connection terminals 60 may be disposed on the same side surface, however the present invention is not limited thereto. The subsidiary terminal 62 may be disposed, in various positions, when necessary. For example, the subsidiary terminal 62 may be disposed on a side surface on which the other external connection terminals 60 are not disposed.

As described above, the second bobbin 30 according to the present embodiment may be combined with the first bobbin 20 to constitute one body. To achieve this, the second bobbin 30 may include the insertion combining part 40 formed on the outer surface of the flange part 33.

The insertion combining part 40 may include insertion protrusions 28a and 38a and insertion grooves 28b and 38b, which are respectively included in the first bobbin 20 and the second bobbin 30 in a symmetrical type.

The insertion protrusions 28a and 38a and the insertion grooves 26b and 38b may be respectively formed on the outer surfaces of the flange parts 23 and 33, and respectively disposed on the side surfaces of the flange parts 23 and 33, and on the contact face where the first bobbin 20 and the second bobbin 30 face each other.

The insertion protrusions 28a and 38a may be formed on the outer surfaces of the flange parts 23 and 33 such that the insertion protrusions 28a and 38a are outwardly extended from the flange parts 23 and 33, that is, protruded outward, respectively. The insertion, protrusions 28a and 38a are respectively protruded from the side surfaces of the flange parts 23 and 33, which faces each other when the first bobbin 20 and the second bobbin 30 are combined, at different positions.

The insertion grooves 28b and 38b may be respectively positioned on the outer surfaces of the flange parts 23 and 33 such that the insertion protrusions 28a and 33a are inserted into the insertion grooves 29b when the first bobbin 20 and the second bobbin 30 are combined.

Accordingly, when the first bobbin 20 and the second bobbin 30 are combined, the insertion protrusion 28a of the first bobbin 20 is inserted into the insertion groove 38b of the second bobbin 30, and the protrusion 38a of the second bobbin 30 is inserted into the insertion groove 28b of the first bobbin 20.

The present invention takes an example of a case in which all the insertion protrusions 28a and 38a and the insertion grooves 28b and 38b may be formed on the ribs 27 and 37 of the flange parts 23 and 33. Herein, the sizes of the insertion protrusions 28a and 38a and the insertion grooves 28b and 38b may be as large as the thickness of the ribs 27 and 37 so that the first bobbin 20 and the second bobbin 30 are combined with each other more stably.

However, the present invention is not limited thereto. For example, the insertion combining part 40 may be directly formed on the side surfaces of the flange parts 23 and 33 but not on the ribs 27 and 37 of the flange parts 23 and 33. Further, there may be various applications such as forming separate protruding blocks on the flange part 23 and forming insertion protrusions and insertion grooves on the protruding blocks.

Further, the present embodiment takes an example of a case in which the insertion protrusions are protruded in a rectangular shape. However, the present invention is not limited thereto, and for example, the ends of the insertion protrusions 28a and 38a may be formed in a loop type to secure the stable combining force. Herein, separate grooves may be formed such that the loop portions of the insertion protrusions 28a and 38a are hung on and fixed to the insertion grooves 28b and 38b.

Further, the present embodiment takes an example of a case in which one of the insertion protrusions 28a and 38a and corresponding one of the insertion grooves 28b and 38b may be formed on one of the flange parts 23 and 33. However, the present invention is not limited thereto, and for example, more insertion grooves 28b and 38b and more insertion protrusions 28a and 38a may be formed.

By this insertion combining part 40, the first bobbin 20 and the second bobbin 30 according to the present embodiment may be easily combined with each other, and not easily separated from each other.

Meanwhile, in the present embodiment, when the first bobbin 20 and the second bobbin 30 are combined, the flange part 23 of the first bobbin 20 and the flange part 33 of the second bobbin 30 are positioned on the same plane. That is, in the bobbin part 10 where the first bobbin 20 and the second bobbin 30 are combined with each other, only the portions having the ribs 27 and 37 or the terminal combining parts 24 and 34 formed thereon are provided as partially protruded portions, but the entire portion is maintained in a flat thin type. Thus, the present invention may be easily employed in thin display devices, etc.

The individual bobbins 20 and 30 of the bobbin part 10 according to the present embodiment may be easily manufactured by injection molding, but not limited thereto, and may be manufactured by various ways such as press processing or the like. Further, the individual bobbins 20 and 30 of the bobbin part 10 according to the present embodiment may be formed of insulating type resin materials, and may be formed of materials having high heat-resistance and high voltage-resistance.

Materials for forming the individual bobbins 20 and 30 may be Polyphenylene Sulfide (PPS), liquid crystalline polymer (LCP), polybutylene terephthalate (PBT), polyethylene terephthalate (PET), phenolic resin or the like.

The coil part 70 may include the first coil 70a and the second coil 70b.

The first coil 70a is wound in the first winding part 20a formed at the first bobbin 20.

The first coil 70a may be one strand of wire, or a Ritz wire formed by twisting several strands.

Lead wires of this first coil 70a are connected to the external connection terminals 60 included in the first bobbin 20.

The second coil 70b may be wound in the second winding part 30a formed at the second bobbin 30. Lead wires of the second coil 70b are connected, to the external connection terminals 60 included in the second bobbin 30.

Both of the first coil 70a and the second coil 70b according to the present embodiment may be wound in a direction in parallel with a substrate (200 in FIG. 7), on which the first filter T1 of the electromagnetic interference filter 110 is mounted, by the structures of the bobbins 20 and 30.

The electromagnetic interference filter 110 according to the present embodiment may be characterized by winding the first coil 70a and the second coil 70b in the different directions (i.e., the opposite directions). For example, when the first coil is wound around the first bobbin 20 clockwise (A in FIG. 3A), the second coil may be wound around the second bobbin 30 counterclockwise (B in FIG. 3B), and vice versa.

The core 80 is inserted into the penetration holes 21 and 31 formed inside the first bobbin 20 and the second bobbin 30. The core 80 according to the present embodiment may consist of a pair of elements, which may be respectively inserted through the penetration holes 21 and 31 of the first bobbin 20 and the second bobbin 30 to face each other, resulting in the coupling thereof. The core 80 may be 'UU', 'UI', or 'CI' type core 80.

The core 80 may be formed of Mn—Zn based ferrite having high permeability, low loss, high saturation magnetic flux density, high stability, and low production costs as compared to other materials. However, according to the present embodiment, the shape or materials of the core 80 are not limited thereto.

The first filter T1 of the electromagnetic interference filter 110 according to the present embodiment may be configured to be suitable for the automated manufacturing method.

In other words, the first filter T1 of the electromagnetic interference filter 110 according to the present embodiment may be obtained by respectively winding the coils 70 around the first bobbin 20 and the second bobbin 30, combining the first bobbin 20 and the second bobbin 30 with each other after completion of the winding, and then combining the core 80 therewith.

To achieve this, as described above, in the first filter T1 of the electromagnetic interference filter 110 according to the present embodiment, the coils 70 may be wound while the first bobbin 20 and the second bobbin 30 are separated from each other, so that the first coil 70a and the second coil 70b are automatically and easily wound. Herein, the winding may be performed by separate automatic winding equipment.

The first bobbin 20 and the second bobbin 30 after completion of the winding may be easily combined with each other by the insertion combining part 40. This process may be also automatically performed by separate automatic winding equipment.

As such, most of processes for manufacturing the first filter T1 of the electromagnetic interference filter 110 according to the present embodiment, and thus, the manufacturing costs and the manufacturing time can be substantially reduced.

Meanwhile, the second filter T2 of the electromagnetic interference filter 110 shown in FIG. 2 has the same constituent elements as the first filter T1, and the detailed description thereof will be omitted.

Figure 4:
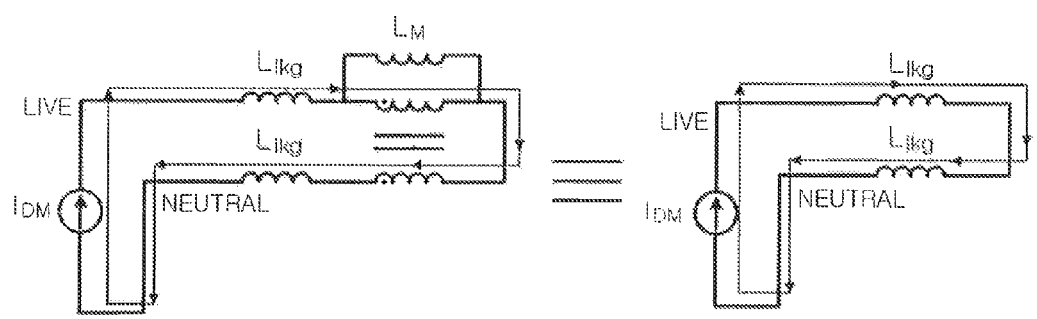
FIG. 4 shows a current conduction path of differential mode electromagnetic interference in a first filter of an electromagnetic interference filter employed in a power supply according to the embodiment of the present invention.

FIG. 4 shows a current conduction path of differential mode electromagnetic interference in the first filter of the electromagnetic interference filter employed in the power supply according to the embodiment of the present invention.

As shown in FIG. 4, the first filter T1 of the electromagnetic interference filter employed in the power supply 100 according to the embodiment of the present invention may be modeled as magnetizing inductance $L_M$ and leakage inductance $L_{lkg}$. The differential mode electromagnetic interference is electrically conducted to the leakage inductance $L_{lkg}$ formed by leakage of magnetic flux flowing through the core by the first and second coils L1 and L2 as an ideal transformer. Thus, the leakage inductance functions as differential mode impedance. Accordingly, when the leakage inductance $L_{lkg}$ is formed to have an inductance size required for removing the differential mode electromagnetic interference, the differential mode electromagnetic interference may be removed using the first filter T1 having the first and second coils L1 and L2 for removing the common mode electromagnetic interference without using additive differential mode coil chokes.

Figure 5A:
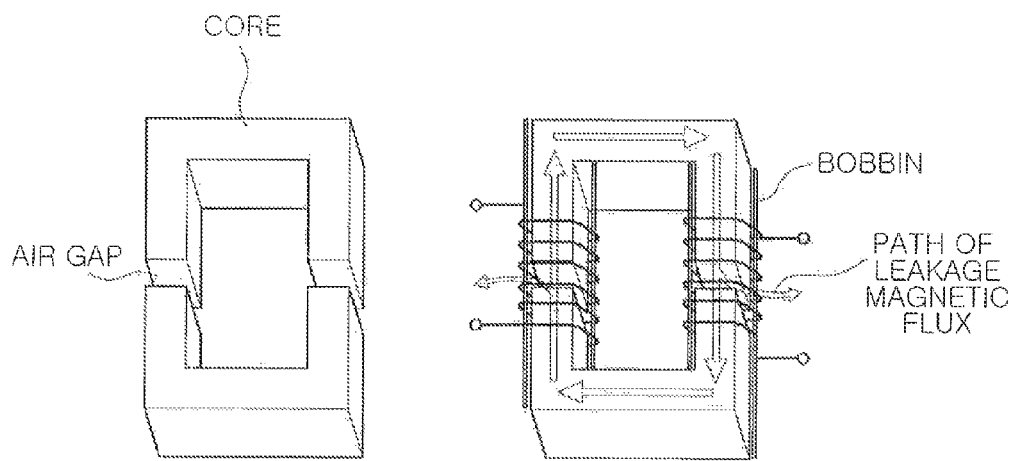
FIG. 5A and FIG. 5B are views showing a leakage magnetic flux path in the first filter of the electromagnetic interference filter employed in the power supply according to the embodiment of the present invention.
Figure 5B:
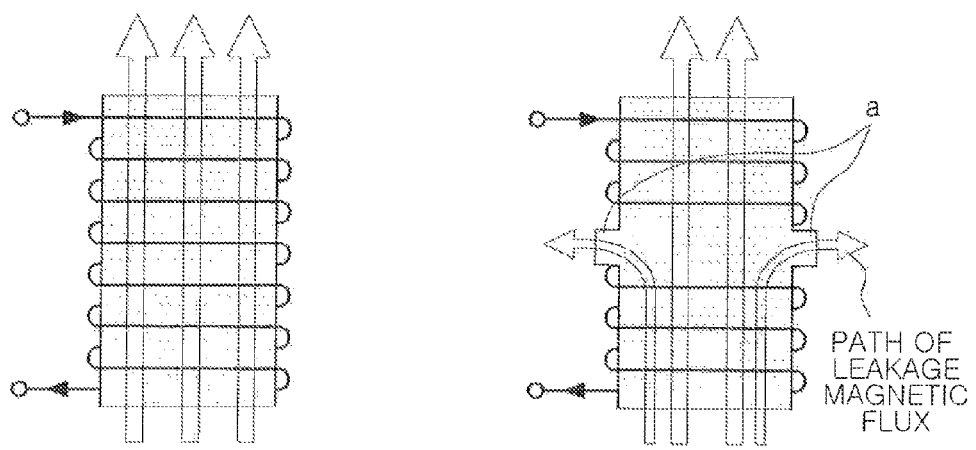

FIG. 5A and FIG. 5B show a path of leakage magnetic flux in the first filter of the electromagnetic interference filter employed in the power supply according to the embodiment of the present invention.

The leakage inductance of the first filter T1, which has the first and second coils L1 and L2 of removing the common mode electromagnetic interference, is induced by leakage flux. Thus, it is necessary to secure a path of the leakage flux in order to control the amount of leakage inductance. Herein, the core of the first filter T1 has a pore (an air gap) to secure the path of the leakage flux. In addition, a protrusion a for separating sections, by which the first coil and the second coil are divided and wound, is formed in the winding part of the bobbin, thereby securing the path of the leakage flux. As a result, the leakage inductance can be increased.

Figure 6:
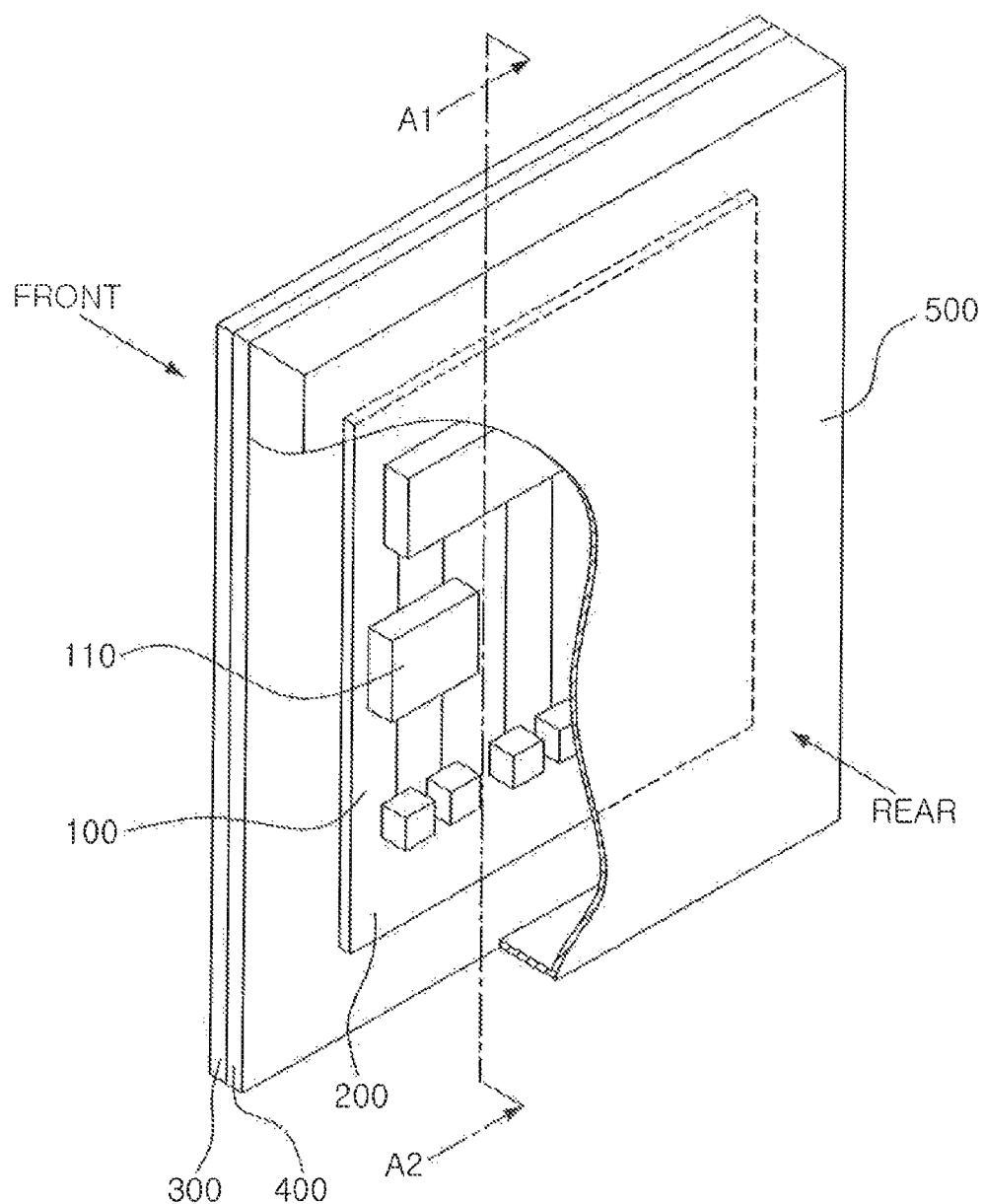
FIG. 6 and FIG. 7 are a cutaway view and a cross section view of a display device employing a power supply according to the embodiment of the present invention.
Figure 7:
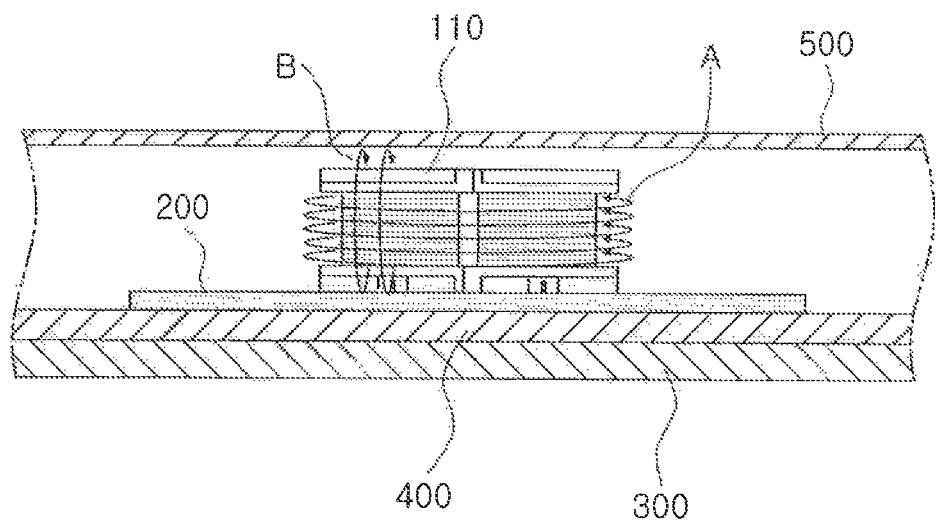

FIG. 6 and FIG. 7 are, respectively, a cutaway view and a cross section view of a display device employing a power supply according to the embodiment of the present invention.

Referring to FIG. 6, a display device employing the power supply according to the embodiment of the present invention may include a panel 300, a backlight unit 400 for supporting the panel 300 and having a light source, a circuit board 200 for supplying power to the light source of the backlight unit 400, an electromagnetic interference filter 110 according to the embodiment of the present invention, for removing electromagnetic interference of the power flowing from the circuit board 200, a power supply 100 including the electromagnetic interference filter, for supplying a driving power to the backlight unit 400, and a back cover 500 combined with the backlight unit 400.

The panel 300 according to the embodiment of the present invention may be a panel of an LCD, but not limited thereto.

For example, when the panel 300 is the panel of the LCD, the backlight unit 400 may include a lamp as a light source, a light guide panel, a plurality of sheets, a lamp reflector, and a mold frame (or a support main).

Herein, the plurality of sheets may include a reflection sheet, a diffusion sheet, a prism sheet, and a protect sheet.

On the other hand, a light emitting diode (LED) may be used as the light source of the backlight unit 400 according to the embodiment of the present invention. The circuit board 200 including the electromagnetic interference filter 110 may further include power elements, power components, and power related circuits, etc., required for supplying power to the display device.

The electromagnetic interference filter 110 may be fixed to the circuit board 200.

Referring to FIG. 7, the electromagnetic interference filter 110 according to the embodiment of the present invention may nave a pair of cores vertically combined with each other, and the wires are horizontally wound around bobbins between the cores. Thus, a main direction of the magnetic flux is a horizontal direction, like an identification letter A. In the magnetic flux having a direction like an identification letter B, the formation of magnetic field may be suppressed by the cores. Thus, the electromagnetic interference between the interference filter 110 and the back cover 500 may be suppressed without employing separate shielding devices. In addition, lower frequency noise due to electromagnetic interference between the interference filter 110 and the back cover 500 according to the embodiment of the present invention may be prevented.

Figure 8A:
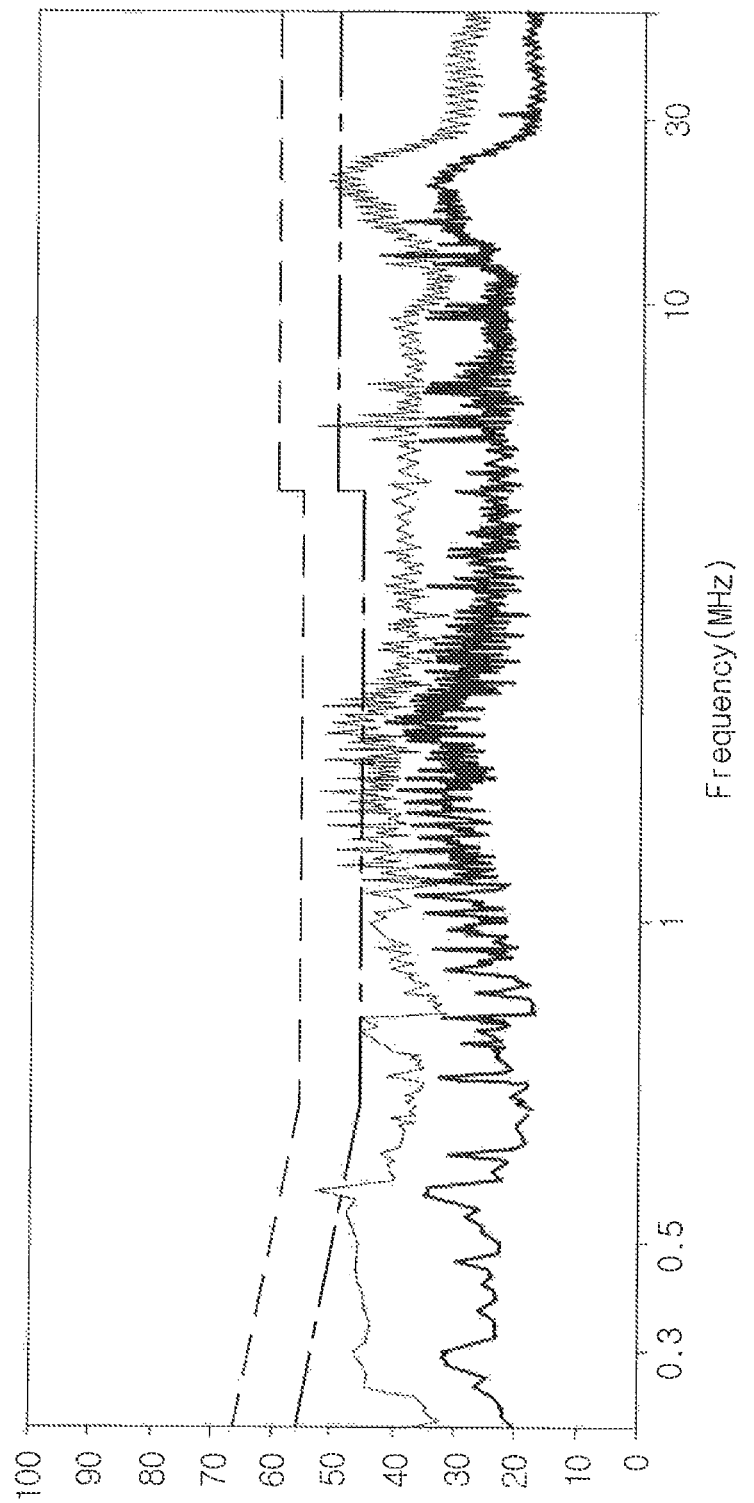
FIG. 8A and FIG. 8B are views showing measured waveforms of common mode electromagnetic interference and differential mode electromagnetic interference of a general power supply.
Figure 8B:
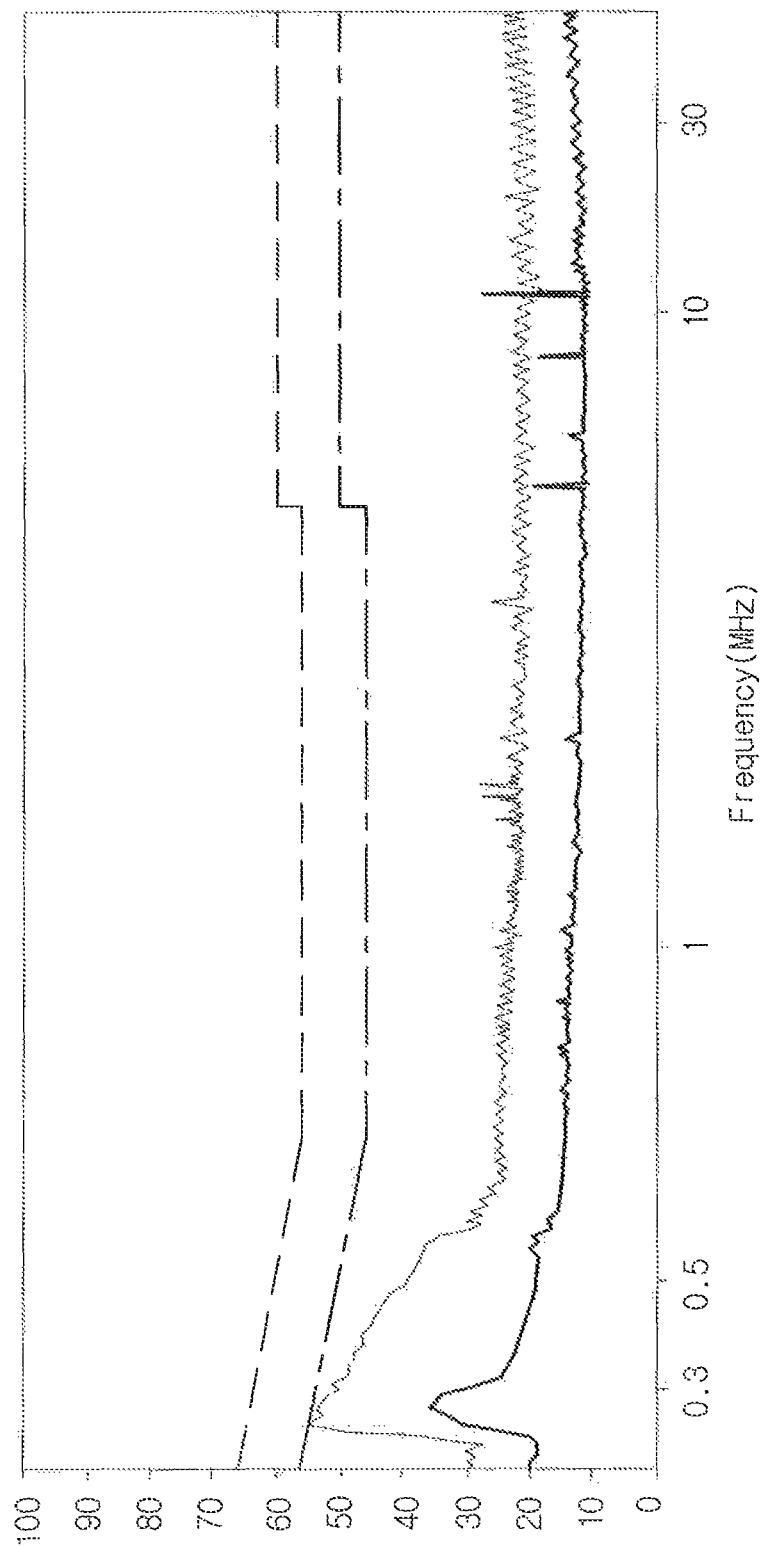

FIG. 8A and FIG. 8B show measured waveforms of common mode electromagnetic interference and differential mode electromagnetic interference in a general power supply.

As described above, the electromagnetic interference may be generated in a power line of the power supply or the display device. The generated electromagnetic interference may be common mode electromagnetic interference shown in FIG. 8A or differential mode electromagnetic interference shown in FIG. 8B. As shown in FIG. 8B, the electromagnetic interference can be seen to increase in a low frequency band of 150 KHz to 500 KHz by power switching for power factor correction of the power factor corrector.

Figure 9A:
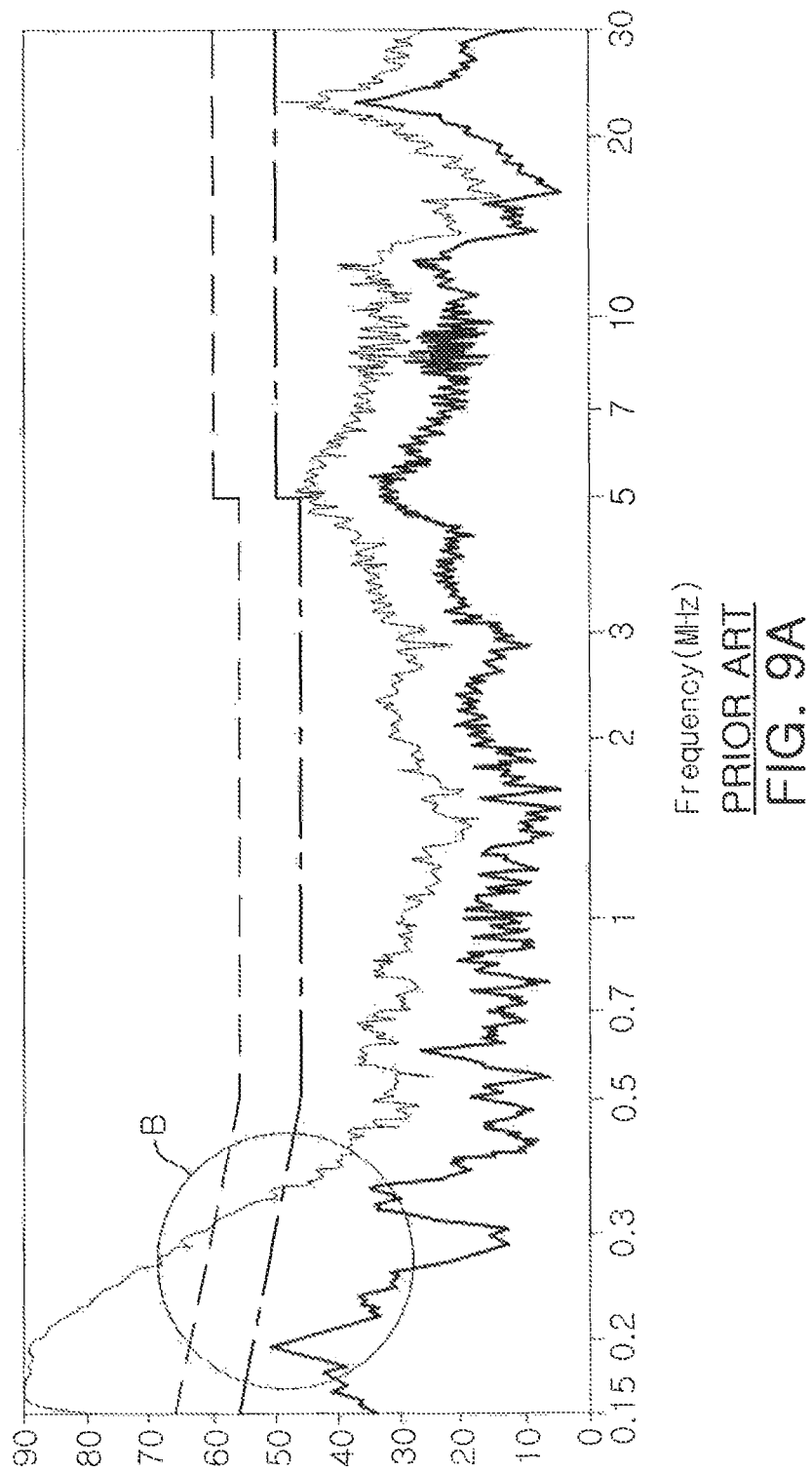
FIG. 9A shows a measured waveform of electromagnetic interference in a power supply having a general differential mode choke coil.
Figure 9B:
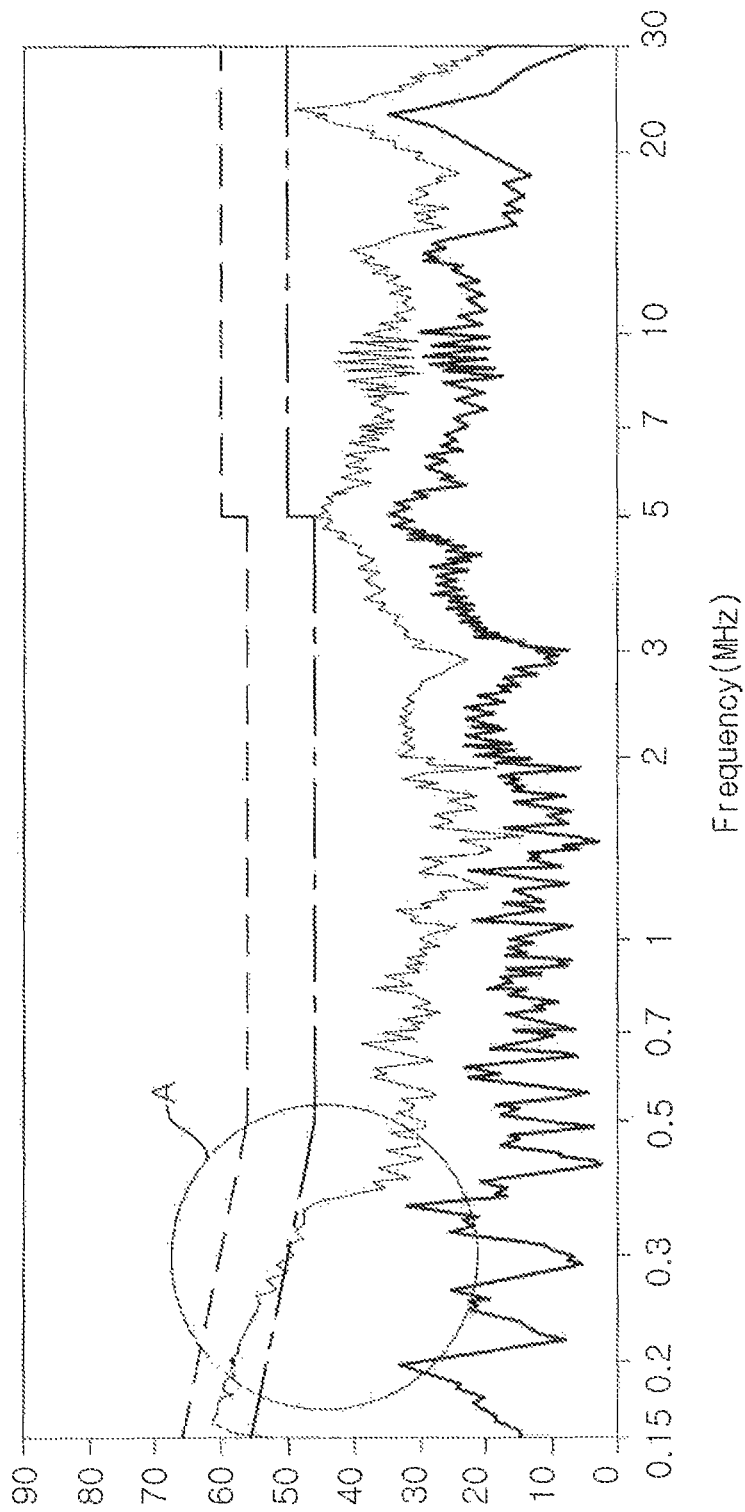
FIG. 9B shows a measured waveform of a power supply where a differential mode chock coil is removed.
Figure 9C:
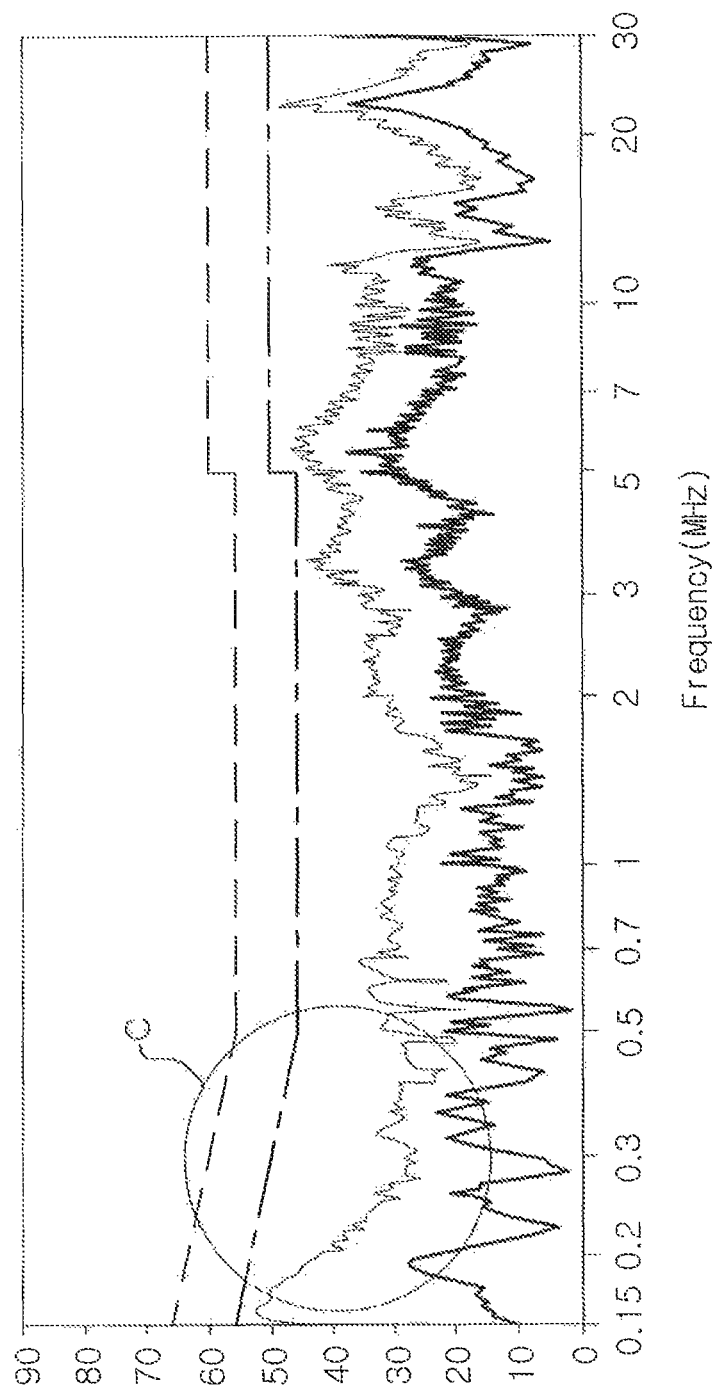
FIG. 9C shows a measured waveform of electromagnetic interference of a power supply according to the embodiment of the present invention.

FIG. 9A shows a measured waveform of electromagnetic interference in a power supply having a general differential mode choke coil, FIG. 9B shows a measured waveform of a power supply where a differential mode chock coil is removed, and FIG. 9C show a measured waveform of electromagnetic interference of a power supply according to the embodiment of the present invention.

As shown in FIG. 9A, the differential mode chock coil is generally employed to remove the above-described differential mode electromagnetic interference, which case satisfies the standard of electromagnetic interference that a user desires even in a low frequency band (see, an identification letter A). As shown in FIG. 9B, when the differential mode chock coil is removed, this case significantly exceeds the standard of electromagnetic interference that the user desires (see, an identification letter B). As shown in FIG. 9C, the power supply according to the embodiment of the present invention may remove the differential mode electromagnetic to satisfy the standard of electromagnetic interference that a user desires, with using only the leakage inductance of a transformer of the electromagnetic interference filter without employing the differential mode choke coil (see, an identification letter C).

As described above, the present invention can reduce circuit area and manufacturing costs, by integrating two coils for removing common mode electromagnetic interference in one core structure and removing the differential mode electromagnetic interference by using leakage inductance formed by leakage of magnetic flux flowing through the core.

Further, the present invention can improve production efficiency and reduce manufacturing costs by winding the coils of the electromagnetic interference filter to allow automatic winding. In addition, the present invention can prevent the low frequency noise due to the interference between magnetic fields generated in a back cover of metal material and an electromagnetic interference filter, by employing the electromagnetic interference filter in a display device so as to allow a main direction of the magnetic flux to be sec in a horizontal direction.

While the present invention has been shown and described in connection with the exemplary embodiments, it will be apparent to those skilled in the art that modifications and variations can be made without departing from the spirit and scope of the invention as defined by the appended claims.

What is claimed is:

1. A power supply, comprising:
an electromagnetic interference filter including a first filter having a pair of electromagnetically coupled cores having at least two leg parts, first and second bobbins each having a tube-shaped body part having a penetration hole into which each of the leg parts is inserted and having a winding region defined as the circumference of the outer peripheral surface of the body part, and first and second coils respectively wound around the first and second bobbins to remove common mode electromagnetic interference included in power transmitted from a power line, the electromagnetic interference filter removing differential mode electromagnetic interference due to leakage inductance formed due to the leakage of magnetic flux flowing through the cores;
a power factor corrector correcting a power factor of the power where the electromagnetic interference is removed; and
a power converter switching the power-factor-corrected power into driving power having a predetermined voltage level.

2. The power supply of claim 1, wherein the first and second bobbins have an insertion combining part by which the first and second bobbins are combined with each other.

3. The power supply of claim 2, wherein the insertion combining part includes at least one insertion protrusion and at least one insertion groove into which the insertion protrusion is inserted.

4. The power supply of claim 2, wherein the insertion combining part is formed on facing surfaces of the first and second bobbins.

5. The power supply of claim 1, wherein one end of the first coil is electrically connected to a live terminal of the power line, and one end of the second coil is electrically connected to a neutral terminal of the power line.

6. The power supply of claim 1, wherein the first and second coils are respectively wound in opposite directions.

7. The power supply of claim 1, wherein the electromagnetic interference filter further includes a first capacitor group having first and second Y capacitors connected to each other in series between the live terminal and the neutral terminal of the power line and a first X capacitor connected to the first and second Y capacitors in parallel between the live terminal and the neutral terminal of the power line.

8. The power supply of claim 7, wherein the electromagnetic interference filer is electrically connected to a rear end of the first filter and further includes a second filter which has a pair of electromagnetically coupled cores having at least owe leg parts, third and fourth bobbins each having a tube-shaped body part having a penetration hole into which each of the leg parts is inserted and having a winding region defined as the circumference of the outer peripheral surface of the body part, and third and fourth coils respectively wound around the third and fourth bobbins to remove the common mode electromagnetic interference included in the power transmitted from the power line.

9. The power supply of claim 8, wherein the electromagnetic interference filter further includes a second capacitor group having third and fourth Y capacitors connected to each other in series between the other end of the first coil and the other end of the second coil of the first filter and a second X capacitor connected to the third and fourth Y capacitors in parallel between the other end of the first coil and the other end of the second coil of the first filter.

10. The power supply of claim 1, wherein the pair of cores are UU cores, UI cores, or CI cores.

11. The power supply of claim 1, further comprising a rectifier rectifying and smoothing the power where the electromagnetic interference is removed by the electromagnetic interference filter and transmitting the rectified and smoothed power to the power factor corrector.

12. The power supply of claim 1, wherein each of the first and second bobbins has a protrusion, by which the first and second coils are respectively wound to leak the electromagnetic flux.

13. A display device, comprising:
a panel;
a backlight unit disposed at the rear of the panel to irradiate light;
a circuit board disposed at the rear of the backlight unit; a power supply formed on the circuit, board to supply power to the backlight unit; and
a back cover combined with the backlight unit to cover the circuit board and a transformer,
wherein the power supply includes:
an electromagnetic interference filter including a first filter which has a pair of electromagnetically coupled cores having at least two leg parts, first and second bobbins each having a tube-shaped body part having a penetration hole into which each of the leg parts is inserted and having a winding region defined as the circumference of the outer peripheral surface of the body part, and first and second coils respectively wound around the first and second bobbins to remove common mode electromagnetic interference included in power transmitted from a power line, the electromagnetic interference filter removing differential mode electromagnetic interference due to leakage inductance formed due to the leakage of magnetic flux flowing through the cores;
a power factor corrector correcting a power factor of the power where the electromagnetic interference is removed; and
a power converter switching the power-factor-corrected power into a driving power having a predetermined voltage level.

14. The display device of claim 13, wherein the first and second bobbins have an insertion combining part by which the first and second bobbins are combined with each other.

15. The display device of claim 14, wherein the insertion combining part includes at least one insertion protrusion and at least one insertion groove into which the insertion protrusion is inserted.

16. The display device of claim 14, wherein the insertion combining part is formed on facing surfaces of the first and second bobbins.

17. The display device of claim 13, wherein one end of the first coil is electrically connected to a live terminal of the power line, and one end of the second coil is electrically connected to a neutral terminal of the power line.

18. The display device of claim 13, wherein the first and second coils are respectively wound in opposite directions.

19. The display device of claim 16, wherein the electromagnetic interference filter further includes a first capacitor group having first and second Y capacitors connected to each other in series between the live terminal and the neutral terminal of the power line and a first X capacitor connected to the first and second Y capacitors in parallel between the live terminal and the neutral terminal of the power line.

20. The display device of claim 19, wherein the electromagnetic interference filer is electrically connected to a rear end of the first filter, and further includes a second filter which has a pair of electromagnetically coupled cores having at least two leg parts, third and fourth bobbins each having a tube-shaped body part having a penetration hole into which each of the leg parts is inserted and having a winding region defined as the circumference of the outer peripheral surface of the body part, and third and fourth coils respectively wound around the third and fourth bobbins to remove the common mode electromagnetic interference included in the power transmitted from the power line.

21. The display device of claim 20, wherein the electromagnetic interference filter further includes a second capacitor group having third and fourth Y capacitors connected to each other in series between the other end of the first coil and the other end of the second coil of the first filter and a second X capacitor connected to the third and fourth Y capacitors in parallel between the other end of the first coil and the other end of the second coil of the first filter.

22. The display device of claim 13, wherein the pair of cores are UU cores, UI cores, or CI cores.

23. The display device of claim 13, further comprising a rectifier rectifying and smoothing the power where the electromagnetic interference is removed by the electromagnetic interference filter and transmitting the rectified and smoothed power to the power factor corrector.

24. The display device of claim 13, wherein the backlight unit includes at least one light emitting diode.

25. The display device of claim 13, wherein each of the first and second bobbins has a protrusion, by which the first and second coils are respectively wound to leak the electromagnetic flux.

* * * * *